United States Patent
Deluca et al.

(10) Patent No.: US 10,032,259 B2
(45) Date of Patent: Jul. 24, 2018

(54) PERSISTING IMAGE MODIFICATIONS FOR USER PROFILE

(71) Applicant: INTERNATIONAL BUSINESS MACHINES CORPORATION, Armonk, NY (US)

(72) Inventors: Lisa Seacat Deluca, Baltimore, MD (US); Jeremy A. Greenberger, Raleigh, NC (US); Trudy L. Hewitt, Cary, NC (US); Jana H. Jenkins, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 55 days.

(21) Appl. No.: 15/228,173

(22) Filed: Aug. 4, 2016

(65) Prior Publication Data
US 2018/0040110 A1  Feb. 8, 2018

(51) Int. Cl.
G06K 9/00 (2006.01)
G06T 5/00 (2006.01)
G06T 11/60 (2006.01)

(52) U.S. Cl.
CPC .......... G06T 5/005 (2013.01); G06K 9/00221 (2013.01); G06T 11/60 (2013.01); G06K 2009/00328 (2013.01); G06T 2207/30201 (2013.01)

(58) Field of Classification Search
USPC ....................................................... 382/118
See application file for complete search history.

(56) References Cited

U.S. PATENT DOCUMENTS

| | | | |
|---|---|---|---|
| 7,202,886 B2 * | 4/2007 | Matsuo | G06T 13/80 348/14.01 |
| 8,520,028 B1 | 8/2013 | Freyhult et al. | |
| 9,014,500 B2 | 4/2015 | Shuster et al. | |
| 9,053,556 B2 * | 6/2015 | Matsuhira | G06T 3/4038 |
| 9,118,876 B2 * | 8/2015 | Felt | A45D 44/005 |
| 9,183,460 B2 * | 11/2015 | Zhang | G06K 9/6202 |
| 9,201,624 B2 * | 12/2015 | Joo | G06F 3/1423 |
| 9,286,706 B1 * | 3/2016 | Krishnaswamy | G06K 9/00288 |
| 9,460,340 B2 * | 10/2016 | Kauffmann | G06K 9/00362 |
| 9,749,494 B2 * | 8/2017 | Jeong | H04N 1/32128 |
| 9,749,581 B2 * | 8/2017 | Nilsson | H04N 7/141 |
| 2013/0204940 A1 | 8/2013 | Kinsel et al. | |

(Continued)

OTHER PUBLICATIONS

Peter Mell et al, The NIST Definition of Cloud Computing, National Institute of Standards and Technology, Publication 800-145, Dec. 2011.

(Continued)

Primary Examiner — Jerome Grant, II
(74) Attorney, Agent, or Firm — Patrick J. Daugherty; Driggs, Hogg, Daugherty & Del Zoppo Co., LPA (57) ABSTRACT

Aspects saves modifications made to a depiction of a person within a photographic image uploaded to a networked service. In response to determining a presence of another depiction of the identified person in a different photographic image uploaded to the networked service, the modification saved to the profile data is automatically applied to another depiction of the identified person within the different photographic image to an initial publication of the uploaded, different photographic image on the networked service.

17 Claims, 4 Drawing Sheets

(56) References Cited

U.S. PATENT DOCUMENTS

2013/0206832 A1  8/2013  Hashimoto
2015/0277686 A1  10/2015  Laforge et al.

OTHER PUBLICATIONS

A. Sibak, Constructing the Self through the Photo selection—Visual Impression Management on Social Networking Websites, Cyberpsychology, Journal of Psychosocial Research on Cyberspace, Dec. 2009.
Peter Werner Balsiger et al, Context Based Social Network Profile Picture, IPCOM000239764D, Dec. 2014.
Disclosed Anonymously, Method for Picture Exposure of Dynamic Subject Matter on Mobile Devices, IPCOM000245560D, Dec. 2016.
Ziaul Haque Cloudhury et al, Biometrics Security: Facial Marks Detection from the Low Quality Images, International Journal of Computer Applications, Dec. 2013.
Fotor, Photo Retouching, Retouch Your Photos, https://www.fotor.com/features/photo-retouching.html, Dec. 2016.
Android, Top 8 Apps for Skin Smoothing (android), http://apcrawlr.com/android-apps/best-apps-skin-smoothing, Feb. 2016.
Portrait Pro, Easy Photo Editing Software, http://www.portraitprofessional.com, Dec. 2016.

* cited by examiner

PERSISTING IMAGE MODIFICATIONS FOR USER PROFILE

BACKGROUND

Social networking services enable users to share comments, photographs, web link citations and other content through a variety of internet-based applications with other users, as well as with non-users or members of the public that gain access to the relevant internet site content. Depending on the social media platform deployed, users as members may be able to directly contact and engage in communications with any other member. Social networking services facilitate the development of online social networks by connecting a user's profile with those of other individuals and/or groups, and comprehend a variety of media, network and site infrastructures.

A user generally creates a unique profile that is personal to the user and includes textual and audio-visual data that communicates or projects basic identity, demographic or personal user information on a given social networking service. Some data shared to a social network site on behalf of a user is provided by other users, typically via obtaining prior permission to upload data items based on a recognized relationship to the user, such as a friend, business colleague, school mate, family member, etc.

Data uploads or comments from other users that are relevant to another user may be added within that user's knowledge or approval, dependent on the relationship-based identity or permission recognized by the rules of a particular social network site. Such shared content may include text comments and messages and uploaded photographic images (video, still pictures). Often a user is identified in uploaded photographic images by "tagging" or other metadata entries, while visibly engaged in activities such as touring geographic sites, attending events, engaged in public performances (for example, speaking, acting, playing music, playing sports), etc. Thus, a variety of different photographic content items shared by a user or other, permitted user within a predefined relationship to that user combine to convey a public persona or impression of the user to viewers or users of the social networking site.

BRIEF SUMMARY

In one aspect of the present invention, a computerized method for persistent depiction modification across multiple images executes steps on a computer processor. Thus, a modification is made to a depiction of a person within a first photographic image in response to an upload to a networked service of photographic data comprising the first photographic image. In response to determining an identity of a person of the modified depiction, the modification to the depiction is saved to profile data of the identified person. The aspect determines a presence of another depiction of the identified person in a different (second) photographic image uploaded to the networked service, wherein the other depiction is different from the depiction of the identified person within the first photographic image. The modification to the depiction of the person within the first photographic image saved to the profile data is automatically applied to the other depiction within the second photographic image prior to an initial publication of the uploaded second photographic image on the networked service.

In another aspect, a system has a hardware processor in circuit communication with a computer readable memory and a computer-readable storage medium having program instructions stored thereon. The processor executes the program instructions stored on the computer-readable storage medium via the computer readable memory and thereby makes a modification to a depiction of a person within a first photographic image in response to an upload to a networked service of photographic data comprising the first photographic image. In response to determining an identity of a person of the modified depiction, the modification to the depiction is saved to profile data of the identified person. The aspect determines a presence of another depiction of the identified person in a different (second) photographic image uploaded to the networked service, wherein the other depiction is different from the depiction of the identified person within the first photographic image. The modification to the depiction of the person within the first photographic image saved to the profile data is automatically applied to the other depiction within the second photographic image prior to an initial publication of the uploaded second photographic image on the networked service.

In another aspect, a computer program product for persistent depiction modification across multiple images has a computer-readable storage medium with computer readable program code embodied therewith. The computer readable hardware medium is not a transitory signal per se. The computer readable program code includes instructions for execution which cause the processor to make a modification to a depiction of a person within the first photographic image in response to an upload to a networked service of photographic data comprising a first photographic image. In response to determining an identity of a person of the modified depiction, the modification to the depiction is saved to profile data of the identified person. The aspect determines a presence of another depiction of the identified person in a different (second) photographic image uploaded to the networked service, wherein the other depiction is different from the depiction of the identified person within the first photographic image. The modification to the depiction of the person within the first photographic image saved to the profile data is automatically applied to the other depiction within the second photographic image prior to an initial publication of the uploaded second photographic image on the networked service.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
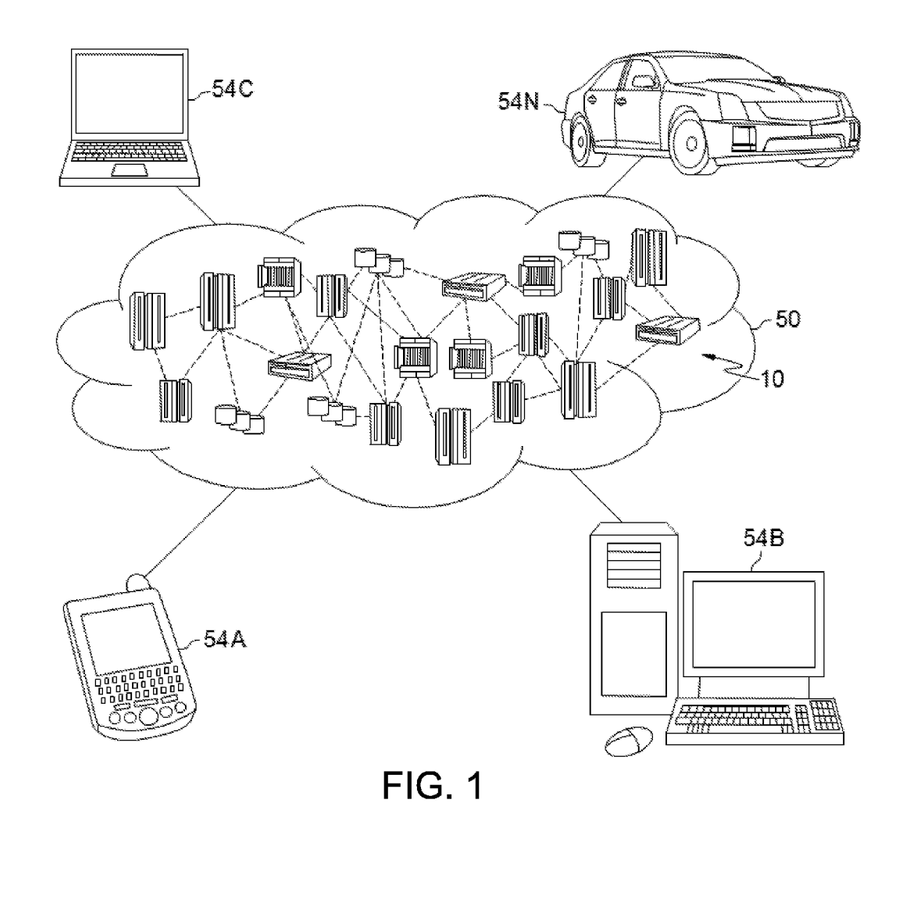
FIG. 1 depicts a cloud computing environment according to an embodiment of the present invention.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
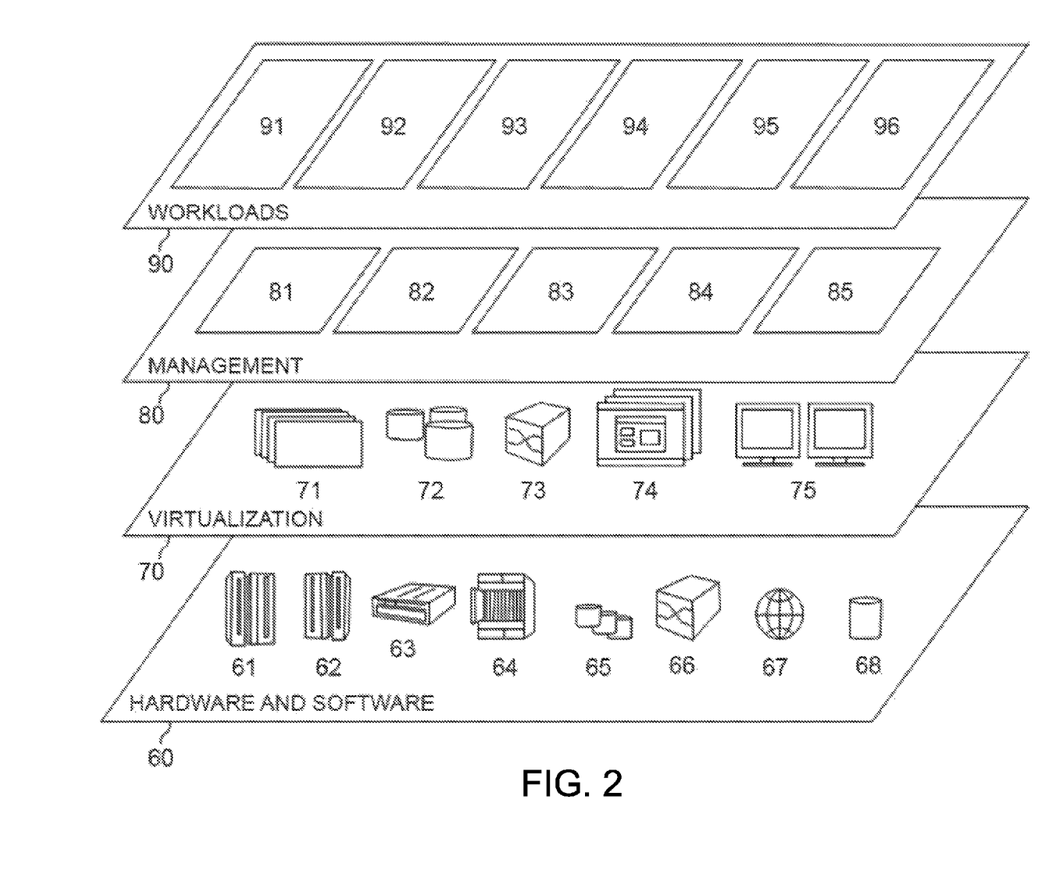
FIG. 2 depicts a cloud computing node according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Figure 4:
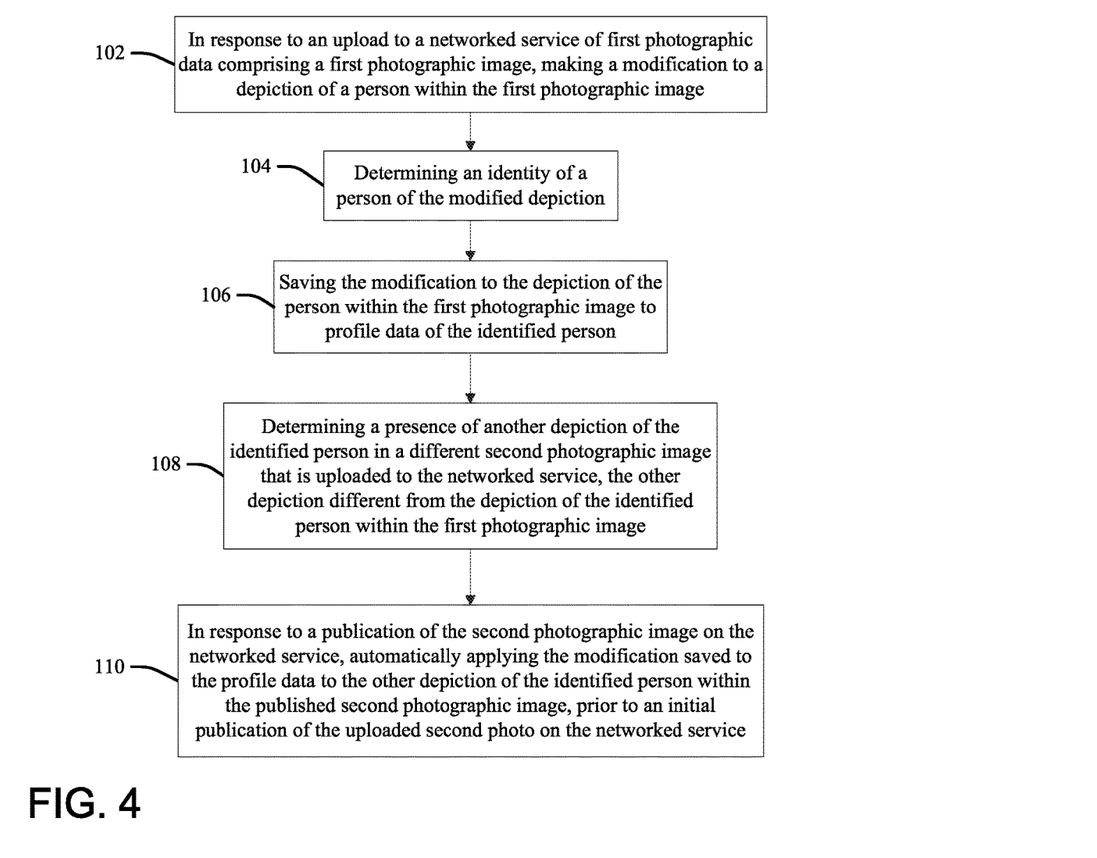
FIG. 4 is a flow chart illustration of a process or system for persistent depiction modification across multiple images according to an embodiment of the present invention.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing 96 according to embodiments of the present invention, for example to execute the process steps or system components or tasks for persistent depiction modification across multiple images as depicted in FIG. 4 and described below.

Figure 3:
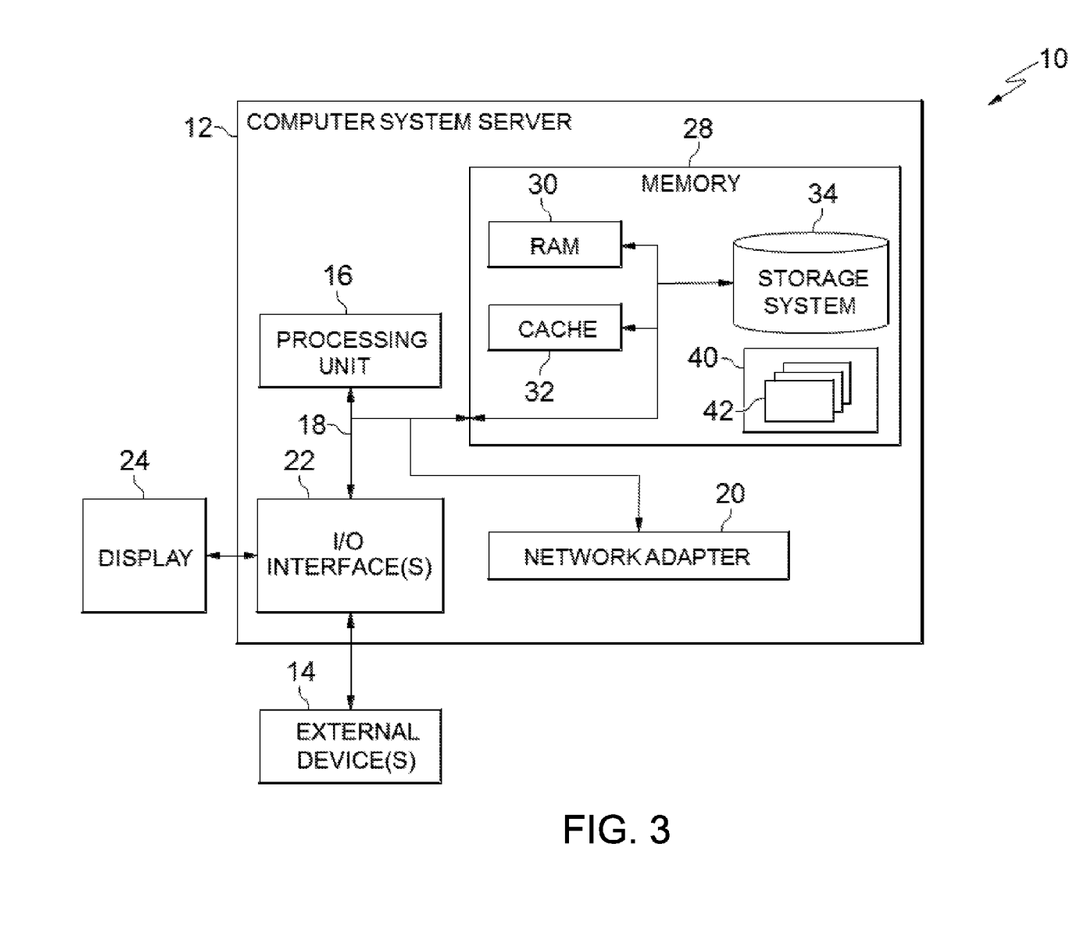
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

As noted in the discussion in the background above, photographic images of a user that are shared on behalf of a user on a social network site may be provided by other users, via permissions granted by the user to said other users through the rules and regulations of a given social network site. This may pose a problem for the user in controlling a public image or persona of the user that such images create and project, as the user generally has limited ability to control how other individuals post photos of the user. Other users may post photos containing images of a user to the user' site or public profile that the user finds unacceptable, for example, unflattering, deceptive, inaccurate, taken out of context, etc.

While social networking service sites generally enable a user to take down or remove an offending picture or posting, this option is typically enabled only after the offending image has already been published. Once published, the offending picture may be easily and quickly copied or archived by other users or viewers of the site. A user is generally powerless to control or prevent the reproduction and re-publication of such copies of the deleted image in the future, either on the same social network site or in another forum.

FIG. 4 illustrates a process or system according to the present invention for persistent depiction modification across multiple images. At 102, in response to an upload to a networked service (for example, a social networking service, a shared storage service, a web page, etc.) of photographic data, a photo editor application executing on a processing unit makes modifications to a depiction of a person within one or more images of the photographic data (video frames, still photographs, etc.)

At 104 a process or system aspect of the present invention identifies or otherwise determines an identity of the person in the depiction that the editor modifies, and at 106 saves the depiction modifications (sometimes hereinafter "edits") to a profile data of the identified person. The profile data may be saved and stored in a variety of locations, including locally on a computer of the executing processor, or appended to a social media profile of the identified person that is stored in a cloud resource, and still other locations will be apparent to one skilled in the art.

At 108 a presence or depiction of the identified person is found in other different photos uploaded to the networked service, wherein the depiction in the other, different photograph(s) is different from the depiction of the identified person within the first photographic image: thus, the pictures are not equivalent, but differ as to composition or creation and as to depictions of the identified person. This search and retrieval process may be accomplished by a variety of techniques, and illustrative but not limiting or exhaustive examples include applying facial recognition processes to image data of the other photos, and recognizing or decoding tagging or other metadata associated with the image data that identifies the person in the other photos.

At 110, in response to a publication of one or more of the other, found photos, the process or system automatically applies the edits saved to the profile data to the depictions of the identified person in the published ones of the other, found photos, wherein the edits are applied to the user's depiction in the photo prior to the initial publication of the uploaded photo on the networked service.

In some aspects the edits are applied at each current and subsequent publication of the photos (for example, on a web page display driven by the networked service to other users), wherein the underlying found photos remain unchanged. In other aspects the found photos are revised with the edits, and revised versions of the photos are saved to a storage device for subsequent retrieval and publication. Thus, the appearance of the identified person is consistently modified across other depictions of the person in the various, other photos, wherein retrieval of the revised photos for any current or subsequent publications in any service (including the present networked service) results in a publication of a depiction of the person that is consistent with (the same as) the edited depiction saved at 106.

In some aspects the person depicted is prompted for confirmation at 110, wherein an affirmative input is required to automatically apply the depiction modifications across the other found photos. Thus, the person may decide against application of the edits to the found photos at 110, and the photos are published as found, without modification. This option may be useful or required where the user isn't the original owner or holder of copyright of the image content published in the found photos, or otherwise does not have permission to revised the photos from the state in which they were found and retrieved.

Thus, aspects of the present invention automatically apply pre-defined edits and other controls to depictions of the user found in different photos or images located in a variety of different networked services and storage areas, which may be uploaded by user or others. Aspects enable a user to pre-define and apply a "touched-up" depiction associated with a saved profile to all images of the user that may appear on the networked service, regardless of their source.

The processes according to the present invention may be automatically performed immediately upon (in response to) the uploading of a new photo that includes a tagged (metadata-identified) depiction of the user, wherein the edits are applied to the user's depiction in the photo prior to the initial publication of the uploaded photo on the networked service. This capability eliminates the possibility that a prior version of the photo (including an un-edited depiction of the user) is published on, or saved or archived from, the networked service. Thus, whenever other users tag the user in an uploaded photograph, pre-defined touch-ups and other image depiction changes under the control of the user may be automatically applied. An uploaded photo that is not yet corrected or "touched up" in a way that the user prefers is automatically refined pursuant to the user's pre-defined instructions prior to posting to or linking to the user's page or site on the networked service.

While the prior art may allow a user to take down or remove an offending picture or posting, taking such actions after an offending picture or posting has already been published is too late to prevent republication after the user takes down the offending content. By enabling a user to touch-up content uploaded by others (photos in which the user is tagged, etc.) prior to publication of the content within user profile data, aspects prevent the persistence of unacceptable images via archived copies of such postings, as well as the generation of inaccurate or unflattering photos. This enables the user to exert better control of a public image or persona of the user created and projected by social media sites, relative to prior art methods and systems.

Aspects provide systems and methods that enable users to create social profiles with edited photos of them that are used to dynamically make the same edits to all future photos posted by them or other users.

Some aspects may dynamically suggest changes for execution at 102, including tattoo or red eye removal, teeth whitening, etc., for the user baseline photos, while also enabling the users to individually customize the photos. For example, the system may not automatically recommend a mole removal; however, if the user selects it for removal at 102, it will remember that (saved the edit) and apply it to future dynamic edits.

Some aspects deploy as paid services, wherein a service provider offers the service to the user in exchange for consideration (fees, agreement to view advertisements published by the service provider, etc.), so that once a user's baseline has been established (edited photo) at 102, the system dynamically applies the edits to future photos that are uploaded by the user and/or other users.

Depiction edits determined at 102 may comprehend the addition of image features as well as their diminishment, subtractions or removals. For example, a bruise, black-eye, tattoo, mole, eye glasses, hair color or hair style, visible scar, external body attribute ("baby bump" associated with time period of pregnancy, cast, eye patch, bandage or other item applied to injured body area, etc.) article of clothing (hat, scarf, etc.), or other associated item that may be found on or in association with the person in the depictions (a pet, cane, etc.) may be automatically added to or subtracted from each depiction within the found photos.

In some aspects the modifications made to the depiction of the identified person are deletion of an image items made in response to determining that the deleted image item is not found (present) within depictions in a majority of a set of photographic depictions of the identified person. Thus, items and features that are not found within the other found photos, or are out of the norm or baseline edit (a new mole, scar, etc., that is not found in the other photos, or only appears in a minority of the photos, etc.) may be automatically deleted, or flagged for the user to review and decide as to whether to make the anomalous item part of the edits saved at 102 (to thereby add to or subtract from all of the depictions). This determination may be made independent of determining the presence of the item within any given found photo depiction of the person, including the photo forming the basis of the edits at 102.

Aspects may automatically apply the saved profiled edits to depictions within still photos, video data, and still other appropriate media will be apparent to one skilled in the art.

In some aspects application of the saved editing profile, or a portion of it, expires after a certain amount of time. For example, wherein the edit deletes black-eye bruising from a recent injury from photographs, its application to new photograph uploads may be set to expire within three weeks, in anticipation that the black-eye bruising will heal and disappear within three weeks, and thus will not be needed for application after three weeks from a current time, but wherein the removal of a scar does not expire but is applied after the three-week period. In another example a removal of a mole or tattoo may be set to expire at the end of a time period during which the person is seeking new employment, as the person may wish to remove such distinctive or distracting markings from images that may be viewed and considered by prospective employers during said time period. Still other examples of temporary application periods will be apparent to one skilled in the art.

The photo profile edits may also be limited in scope to certain designated others, for example, to only subsets of certain friends or business associates on the networked service, or in forums or publications with limited distributions (for example, across a photo album shared by a subset of friends and not with other users on the networked service). Different edits may also be applied to publication to different other users: for example, a tattoo may be deleted from pictures published to share with business colleagues; but not deleted, or even added, to pictures that are determined to be published to share with friends, school mates or family members.

By updating the profile edits the changes are dynamically applied to current and future image publications. Thus, if the user has changed hair color or style, or now wears glasses, the changes can be applied to older photos that lack the same features when those photos are newly published or displayed on the networked service.

Identification of depictions of the user across the found photos may also be dependent upon meeting multiple condition criteria. For example, where the user has an identical twin, additional details might need to be provided for proper profile identification (for example, correct name tagging, geographic and time and date tagging correlating with known location visits of the correct user relative to the other twin, etc.).

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for persistent depiction modification across multiple images, comprising executing on a computer processor:

in response to an upload to a networked service of first photographic data comprising a first photographic image, making a modification to a depiction of a person within the first photographic image;

determining an identity of a person of the modified depiction;

saving the modification to the depiction of the person within the first photographic image to profile data of the identified person;

determining a presence of another depiction of the identified person in a second photographic image that is uploaded to the networked service, wherein the second photographic image is different from the first photographic image, and the another depiction of the identified person in the second photographic image is different from the depiction of the identified person within the first photographic image; and automatically applying the modification to the depiction of the person within the first photographic image that is saved to the profile data of the identified person to the another depiction of the identified person within the uploaded second photographic image prior to an initial publication of the uploaded second photographic image on the networked service; and wherein the modification made to the depiction of the identified person comprises a deletion of the image item from the depiction in response to determining that the deleted image item is not present within depictions of the identified person within a majority of a plurality of photographic images that include the first photographic image and the second photographic image.

2. The method of claim 1, further comprising:

integrating computer-readable program code into a computer system comprising a processor, a computer readable memory in circuit communication with the processor, and a computer readable storage medium in circuit communication with the processor; and wherein the processor executes program code instructions stored on the computer-readable storage medium via the computer readable memory and thereby performs the making the modification to the depiction of the person within the first photographic image in response to the upload to the networked service of the first photographic data comprising the first photographic image, the determining the identity of a person of the modified depiction, the saving the modification to the depiction of the person within the first photographic image to the profile data of the identified person, the determining the presence of another depiction of the identified person in the second photographic image uploaded to the networked service, and the automatically applying the modification to the another depiction of the identified person within the published second photographic image prior to the initial publication of the uploaded second photographic image on the networked service.

3. The method of claim 2, wherein the computer-readable program code is provided as a service in a cloud environment.

4. The method of claim 1, further comprising:

revising image data of the second photographic image to reflect the modification to the depiction of the person applied prior to the initial publication of the uploaded second photographic image on the networked service; and saving the second photographic image with the revised image data on a storage device in communication with the networked service for subsequent publication of the second photographic image on the networked service.

5. The method of claim 1, wherein the modification to the depiction of the person comprises removing or adding an image item that is selected from the group consisting of a bruise, a tattoo, a mole, eye glasses, a hair color, a hair style, a scar, an external body attribute, an article of clothing and an item associated with the identified person.

6. The method of claim 5, further comprising:

selecting the modification made to the depiction of the identified person as a function of an identification of a pre-defined relationship of the identified person to other users of the networked service; and limiting publication of the second photographic image with the automatically applied modification to a subset plurality of users of the networked service that each has the pre-defined relationship to the identified person with respect to the networked service; and wherein the pre-defined relationship is selected from the group consisting of a friend, a business colleague, a school mate, and a family member.

7. The method of claim 6, further comprising:

selecting removal of a tattoo as the modification made to the depiction of the identified person as a function of an identification of the pre-defined relationship as the business colleague; and selecting addition of a tattoo as the modification made to the depiction of the identified person as a function of an identification of the pre-defined relationship as the friend, the school mate, or as the family member.

8. The method of claim 6, further comprising:

limiting the automatically applying the modification to the another depiction of the identified person within the uploaded second photographic image prior to the initial publication of the uploaded second photographic image on the networked service to a specified period of time from a time of the modification to the depiction of the person within the first photographic image that is saved to the profile data of the identified person.

9. A system, comprising:

a processor;

a computer readable memory in circuit communication with the processor; and a computer readable storage medium in circuit communication with the processor;

wherein the processor executes program instructions stored on the computer-readable storage medium via the computer readable memory and thereby:

in response to an upload to a networked service of first photographic data comprising a first photographic image, makes a modification to a depiction of a person within the first photographic image;

determines an identity of a person of the modified depiction;

saves the modification to the depiction of the person within the first photographic image to profile data of the identified person;

determines a presence of another depiction of the identified person in a second photographic image that is uploaded to the networked service, wherein the second photographic image is different from the first photographic image, and the another depiction of the identified person in the second photographic image is different from the depiction of the identified person within the first photographic image; and automatically applies the modification to the depiction of the person within the first photographic image that is saved to the profile data of the identified person to the another depiction of the identified person within the uploaded second photographic image prior to an initial publication of the uploaded second photographic image on the networked service; and wherein the modification made to the depiction of the identified person comprises a deletion of the image item from the depiction in response to determining that the deleted image item is not present within depictions of the identified person within a majority of a plurality of photographic images that include the first photographic image and the second photographic image.

10. The system of claim 9, wherein the processor executes the program instructions stored on the computer-readable storage medium via the computer readable memory and thereby further:
revises image data of the second photographic image to reflect the modification to the depiction of the person applied prior to the initial publication of the uploaded second photographic image on the networked service; and
saves the second photographic image with the revised image data on a storage device in communication with the networked service for subsequent publication of the second photographic image on the networked service.

11. The system of claim 9, wherein the modification to the depiction of the person comprises removing or adding an image item that is selected from the group consisting of a bruise, a tattoo, a mole, eye glasses, a hair color, a hair style, a scar, an external body attribute, an article of clothing and an item associated with the identified person.

12. The system of claim 11, wherein the processor executes the program instructions stored on the computer-readable storage medium via the computer readable memory and thereby further:
selects the modification made to the depiction of the identified person as a function of an identification of a pre-defined relationship of the identified person to other users of the networked service; and
limits publication of the second photographic image with the automatically applied modification to a subset plurality of users of the networked service that each has the pre-defined relationship to the identified person with respect to the networked service; and
wherein the pre-defined relationship is selected from the group consisting of a friend, a business colleague, a school mate, and a family member.

13. The system of claim 12, wherein the processor executes the program instructions stored on the computer-readable storage medium via the computer readable memory and thereby further:
selects removal of a tattoo as the modification made to the depiction of the identified person as a function of an identification of the pre-defined relationship as the business colleague; and
selects addition of a tattoo as the modification made to the depiction of the identified person as a function of an identification of the pre-defined relationship as the friend, the school mate, or as the family member.

14. A computer program product for persistent depiction modification across multiple images, the computer program product comprising:
a computer readable storage medium having computer readable program code embodied therewith, wherein the computer readable storage medium is not a transitory signal per se, the computer readable program code comprising instructions for execution by a processor that cause the processor to:
in response to an upload to a networked service of first photographic data comprising a first photographic image, make a modification to a depiction of a person within the first photographic image;
determine an identity of a person of the modified depiction;
save the modification to the depiction of the person within the first photographic image to profile data of the identified person;
determine a presence of another depiction of the identified person in a second photographic image that is uploaded to the networked service, wherein the second photographic image is different from the first photographic image, and the another depiction of the identified person in the second photographic image is different from the depiction of the identified person within the first photographic image; and
automatically apply the modification to the depiction of the person within the first photographic image that is saved to the profile data of the identified person to the another depiction of the identified person within the uploaded second photographic image prior to an initial publication of the uploaded second photographic image on the networked service; and
wherein the modification made to the depiction of the identified person comprises a deletion of the image item from the depiction in response to determining that the deleted image item is not present within depictions of the identified person within a majority of a plurality of photographic images that include the first photographic image and the second photographic image.

15. The computer program product of claim 14, wherein the computer readable program code instructions for execution by the processor further cause the processor to:
revise image data of the second photographic image to reflect the modification to the depiction of the person applied prior to the initial publication of the uploaded second photographic image on the networked service; and
save the second photographic image with the revised image data on a storage device in communication with the networked service for subsequent publication of the second photographic image on the networked service.

16. The computer program product of claim 14, wherein the modification to the depiction of the person comprises removing or adding an image item that is selected from the group consisting of a bruise, a tattoo, a mole, eye glasses, a hair color, a hair style, a scar, an external body attribute, an article of clothing and an item associated with the identified person.

17. The computer program product of claim 16, wherein the computer readable program code instructions for execution by the processor further cause the processor to:
select the modification made to the depiction of the identified person as a function of an identification of a pre-defined relationship of the identified person to other users of the networked service; and
limit publication of the second photographic image with the automatically applied modification to a subset plurality of users of the networked service that each has the pre-defined relationship to the identified person with respect to the networked service; and
wherein the pre-defined relationship is selected from the group consisting of a friend, a business colleague, a school mate, and a family member.

* * * * *